United States Patent
Moon (10) Patent No.: US 11,427,148 B2
(45) Date of Patent: Aug. 30, 2022

(54) SIDE AIRBAG APPARATUS

(71) Applicant: HYUNDAI MOBIS CO., LTD., Seoul (KR)

(72) Inventor: Geon Woong Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/238,816

(22) Filed: Apr. 23, 2021

(65) Prior Publication Data

US 2021/0331643 A1  Oct. 28, 2021

(30) Foreign Application Priority Data

Apr. 24, 2020  (KR) .................. 10-2020-0049828

(51) Int. Cl.
| | |
|---|---|
| *B60R 21/207* | (2006.01) |
| *B60R 21/2165* | (2011.01) |
| *B60R 21/231* | (2011.01) |
| *B60R 21/26* | (2011.01) |
| *B60R 21/215* | (2011.01) |

(52) U.S. Cl.
CPC ........ *B60R 21/207* (2013.01); *B60R 21/2165* (2013.01); *B60R 21/23138* (2013.01); *B60R 21/26* (2013.01); *B60R 2021/21537* (2013.01); *B60R 2021/23146* (2013.01)

(58) Field of Classification Search
CPC .............. B60R 21/207; B60R 21/2165; B60R 21/23138; B60R 21/26; B60R 2021/21537; B60R 2021/23146; B60R 21/215; B60R 21/2176; B60R 21/264; B60Y 2304/05; B60Y 2304/07
See application file for complete search history.

(56) References Cited

U.S. PATENT DOCUMENTS

2009/0127838 A1\* 5/2009 Hayashi ............. B60R 21/2165
 280/731
2010/0251950 A1\* 10/2010 Evans .................. B60R 21/207
 112/475.08

FOREIGN PATENT DOCUMENTS

| CN | 103167973 A | * | 6/2013 | ............ B60N 2/289 |
| DE | 102012211927 A1 | * | 1/2013 | ............ B60R 21/207 |
| GB | 2398546 A | * | 8/2004 | ............ B60R 21/207 |
| KR | 10-2004-0074673 A | | 8/2004 | |
| KR | 20180015365 A | * | 2/2018 | ....... B29C 45/14467 |
| WO | WO-2004074050 A1 | * | 9/2004 | ............ B60R 21/207 |

\* cited by examiner

*Primary Examiner* — Drew J Brown
(74) *Attorney, Agent, or Firm* — NovoTechIP International PLLC (57) ABSTRACT

A side airbag may include: a bracket coupled to a side portion of a seat; a housing to which the bracket is coupled along the edge thereof through insert molding, and which has an internal housing space communicating with the outside through an opening formed on one side thereof; a cover formed as one body with the housing so as to close the opening, and having a tear line formed along the edge thereof; and a cushion housed in the housing space, and deployed to the outside through the opening by an inflation force while tearing the tear line, when gas is supplied thereto.

12 Claims, 9 Drawing Sheets

SIDE AIRBAG APPARATUS

CROSS-REFERENCE TO RELATED APPLICATION

This application claims the benefit under 35 U.S.C. § 119(a) of Korean Patent Application No. 10-2020-0049828 filed on Apr. 24, 2020 in the Korean Intellectual Property Office, the entire disclosure of which is incorporated herein by reference for all purposes.

BACKGROUND

Field

Exemplary embodiments of the disclosed subject matter relate to a side airbag, and more particularly, to a side airbag, which can prevent a housing from being damaged by a force applied during cushion deployment, through a bracket formed at the edge of the housing by insert molding.

Discussion of the Background

In general, a side airbag of a vehicle refers to an apparatus that can instantaneously inflate an airbag to reduce risk of injury caused by impact upon a vehicle collision.

The side airbag is embedded in a side portion of a seat on which a passenger is seated. When a side collision of a vehicle occurs, the side airbag is deployed to the side of the seat, and protects the passenger from impact caused by the side collision.

The conventional side airbag includes a cushion embedded in the side portion of the seat, an inflator connected to the cushion and configured to deploy the cushion by generating high-pressure gas upon a vehicle accident, and a cover coupled to the side portion of the seat and configured to cover the cushion.

Such a side airbag has a structure in which the cushion is inflated by gas supplied by the inflator upon vehicle accident, and deployed to the outside of the seat while the cover is opened by an inflation force.

In the conventional side airbag, however, the cover of the seat is opened to apply a large force to a side structure (garnish or the like) of the seat, when the cushion is deployed. Thus, the side structure of the seat may be damaged. Furthermore, since a structure for coupling the cover to the side portion of the seat needs to be applied, assembly is complicated, and the assembly structure of the cover is exposed to the outside thus disturbing the appearance of the vehicle.

The related art of the present disclosure is disclosed in Korean Patent Application Publication No. 10-2004-0074673 published on Aug. 25, 2004 and entitled "Side Airbag for Vehicle".

SUMMARY

Various embodiments are directed to a side airbag in which a housing can be prevented from being damaged by an inflation force of a cushion because the housing is reinforced by an insert molding method, and a cover and the housing are integrally formed, thereby not only reducing the number of parts but also simplifying assembly and resultant structure.

In an embodiment, a side airbag may include: a bracket coupled to a side portion of a seat; a housing to which the bracket is coupled along an edge thereof through insert molding, and which has an internal housing space communicating with an outside through an opening formed on one side thereof; a cover formed integrally with the housing so as to close the opening, and having a tear line formed along an edge thereof; and a cushion housed in the housing space, and deployed outwardly through the opening by an inflation force while tearing along the tear line, when gas is supplied thereto.

The cover may be connected to an inner circumferential surface of the opening by a hinge part. When the cushion is deployed, the cover connected to the hinge part may be opened to the outside of the housing.

The tear line may be concavely formed on an outer surface of the cover, and have an outer groove formed along the edge of the cover.

The tear line may be concavely formed on an inner surface of the cover, and have an inner groove formed along the edge of the cover.

The tear line may include: an outer groove formed concavely on an outer surface of the cover, and along the edge of the cover; and an inner groove formed concavely on an inner surface of the cover, and along the edge of the cover.

A connection unit may be formed between the outer groove and the inner groove so as to connect the edge of the cover to the inner surface of the opening.

The connection unit may be torn away by the force of inflation when the cushion is deployed.

The bracket may include: a first frame coupled along the edge of the housing through insert molding, and having a first connector for coupling the first frame to a side surface of the seat through a fastening member; and a second frame coupled along the edge of the housing through insert molding, and having a second connector for coupling the second frame to the side surface of the seat through a fastening member.

The side airbag may further include a decoration member coupled to the side portion of the seat, configured to cover the edge of the housing, and having a through-hole through which the housing extends to the side portion of the seat.

The first and second connectors may protrude outwardly from the edge of the housing, and the decoration member may cover the first and second connectors at the side portion of the seat.

The side airbag may further include an auxiliary bracket formed in the housing space and coupled to the side portion of the seat. The cushion part and a gas supply unit for supplying gas to the cushion may be coupled to the auxiliary bracket.

When the cushion is deployed, the cushion may apply an inflation force toward the cover so as to tear along the tear line, while being supported by the auxiliary bracket.

In accordance with the disclosed embodiment, the edge portion of the housing is reinforced by the insert molding method, so that it is possible to prevent damage to the housing by the inflation force of the cushion. Since the cover is integrally formed with the housing, the number of parts in the apparatus may be reduced, and the assembly and structure thereof may be simplified.

Furthermore, when the cushion is deployed, the cover is torn away along the tear line having a relatively small thickness, which makes it possible to easily deploy the cushion in a predetermined direction.

DETAILED DESCRIPTION OF THE ILLUSTRATED EMBODIMENTS

Hereafter, exemplary embodiments of the invention will be described in detail with reference to the accompanying drawings.

The advantages and features of the present disclosure and a method for accomplishing the advantages and features will be clarified through embodiments which will be described below with reference to the accompanying drawings.

However, the present invention is not limited by the following embodiments, but may be implemented in various manners, these embodiments disclosed herein are provided so that this disclosure will be thorough and complete and the scope of the present disclosure will be fully conveyed to those skilled in the art, the invention presented in the present disclosure being defined only by the claims.

Moreover, in describing the present invention, detailed descriptions related to well-known functions or configurations will be omitted in order not to unnecessarily obscure the subject matter of the present disclosure.

Figure 1:
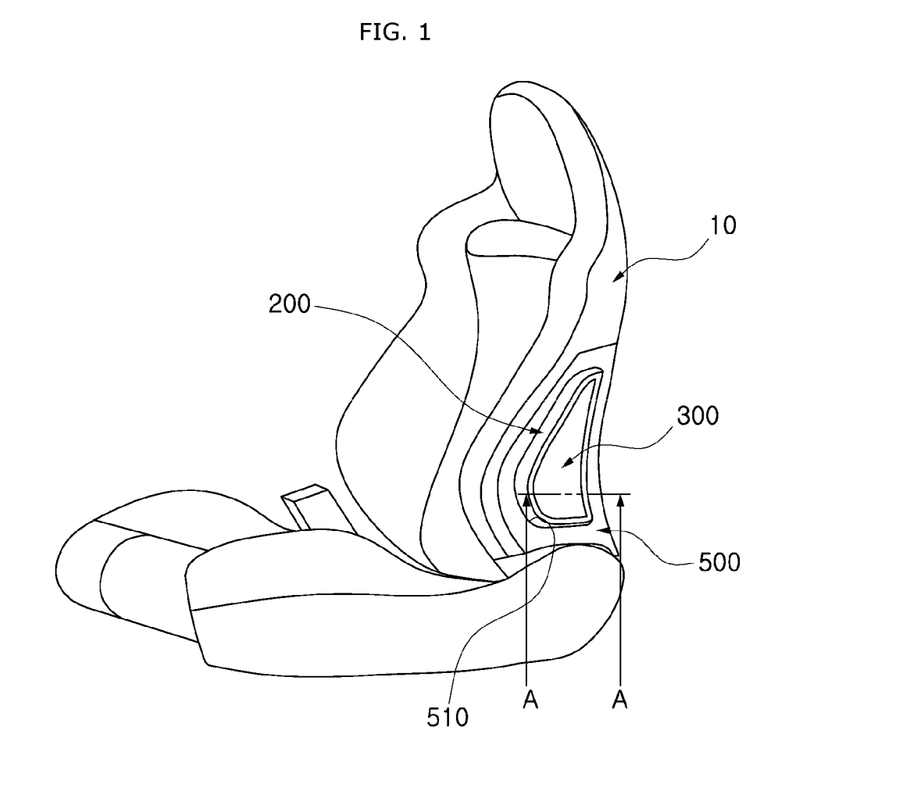
FIG. 1 is a perspective view illustrating a side airbag, in accordance with an embodiment of the present disclosure, installed in a seat.
Figure 2:
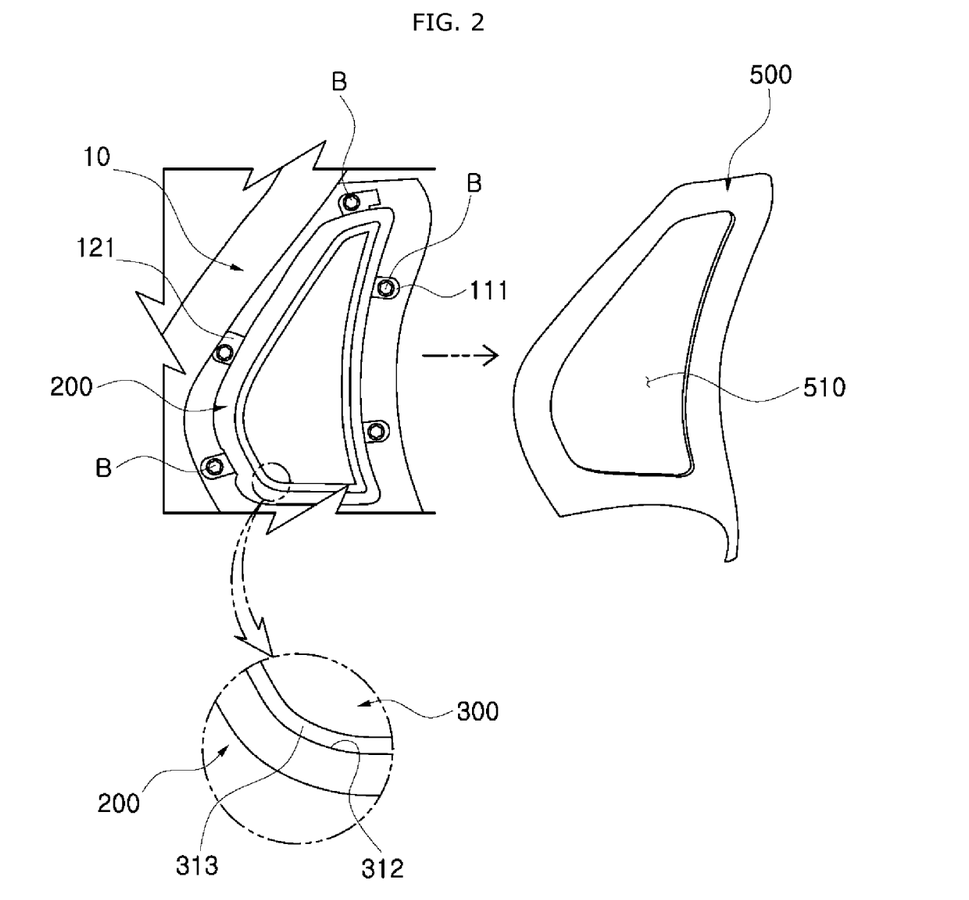
FIG. 2 is a side view of the side airbag shown in FIG. 1.
Figure 3:
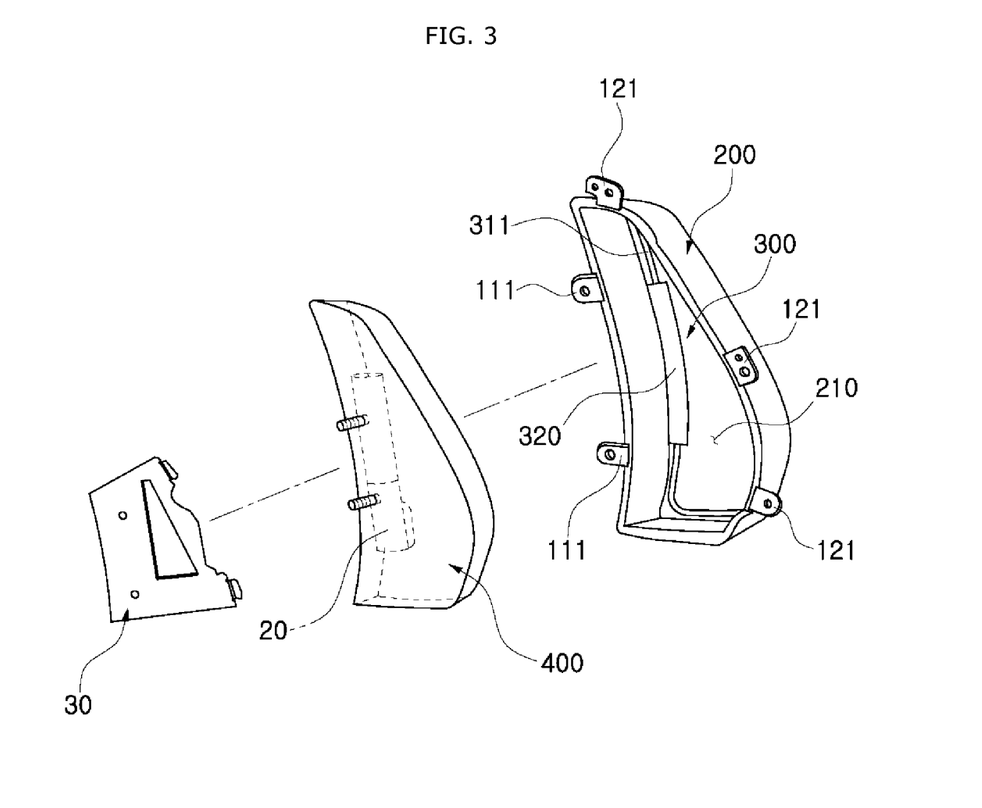
FIG. 3 is a perspective view illustrating a housing, a cushion and an auxiliary bracket of the side airbag in accordance with the disclosed embodiment, separated from one another.

FIG. 1 is a perspective view illustrating a side airbag in accordance with an embodiment of the present invention installed in a seat, FIG. 2 is a side view illustrating the side airbag installed in the seat, and FIG. 3 is a perspective view illustrating a housing, a cushion and an auxiliary bracket of the side airbag, in accordance with the disclosed embodiment, separated from one another.

Figure 4:
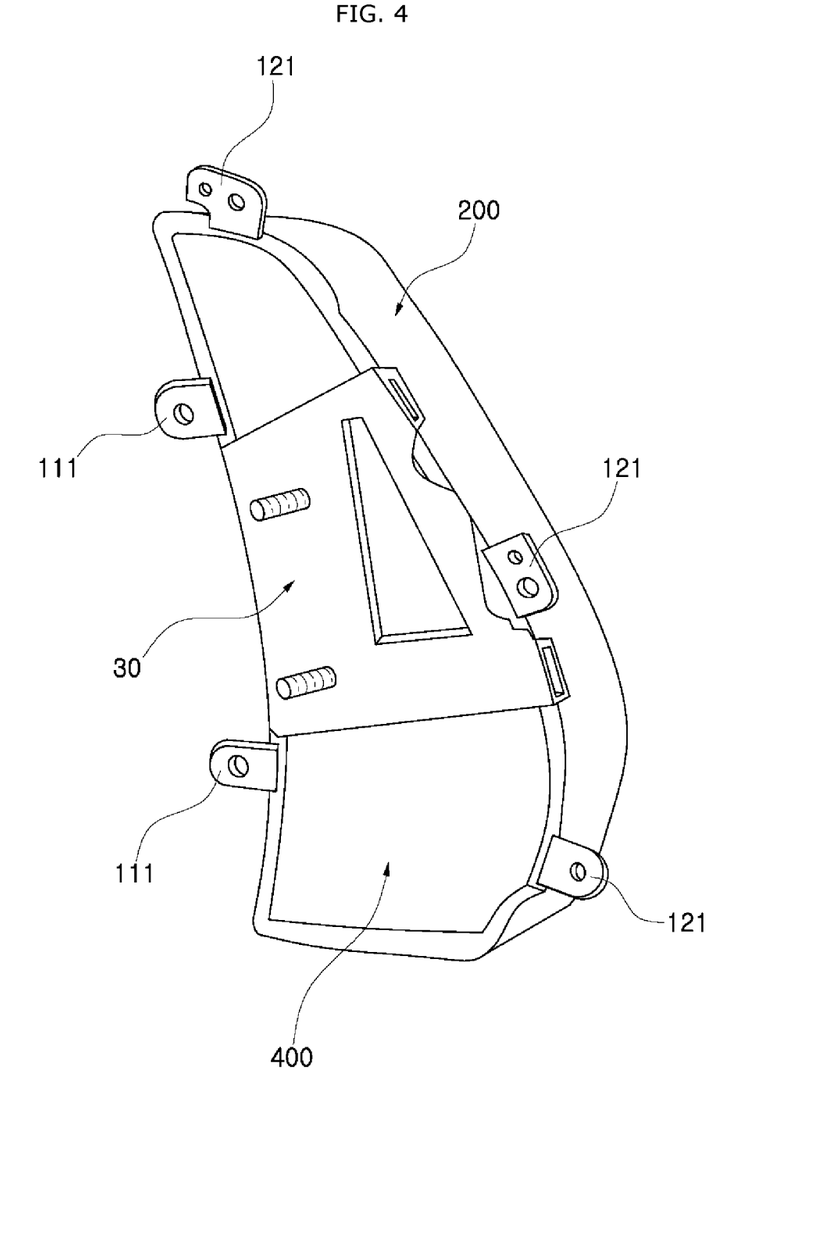
FIG. 4 is a perspective view illustrating the housing, the cushion and the auxiliary bracket of the side airbag in accordance with the disclosed embodiment, coupled to one another.
Figure 5:
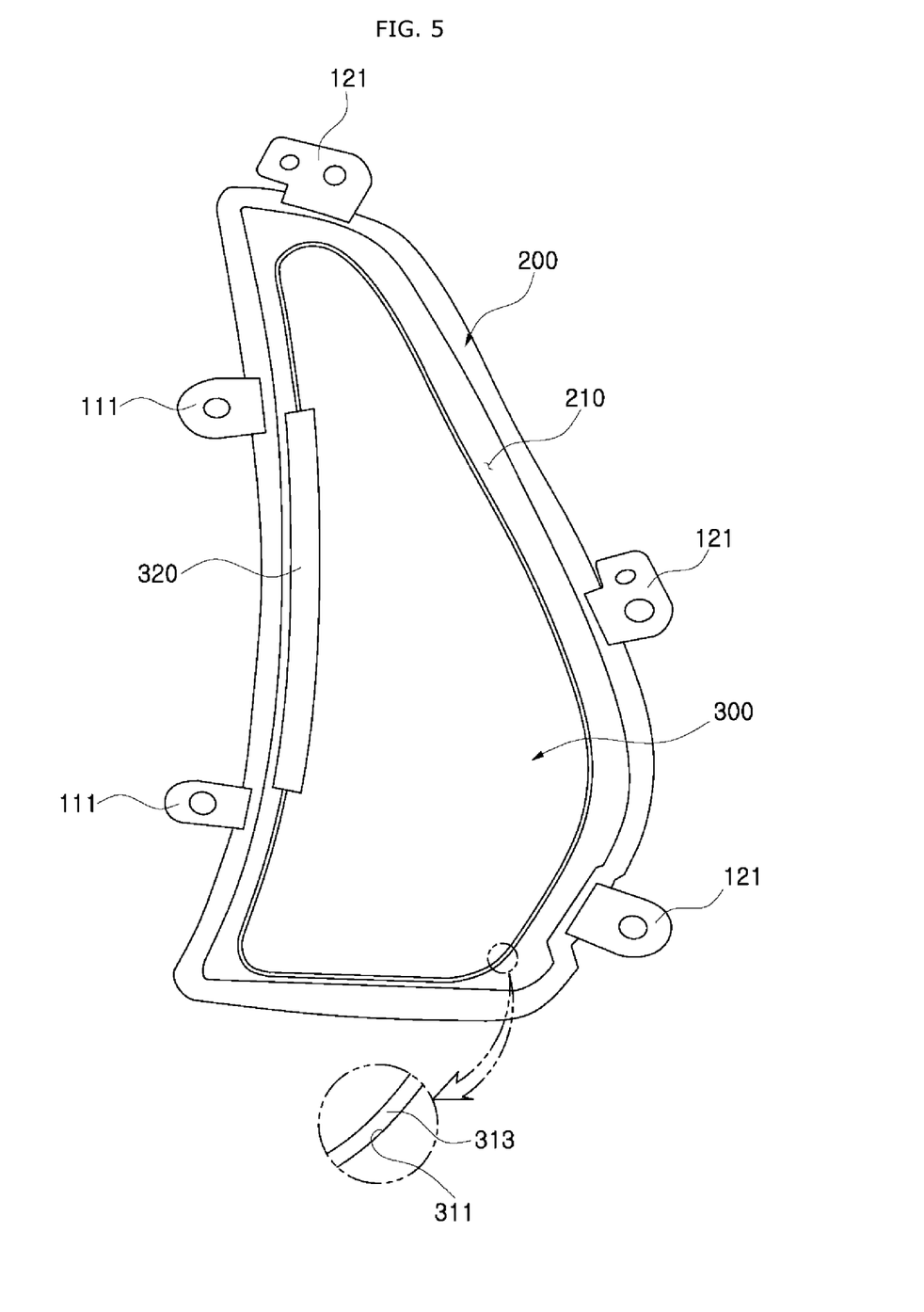
FIG. 5 is a rear view illustrating the housing and the bracket of the side airbag.
Figure 6:
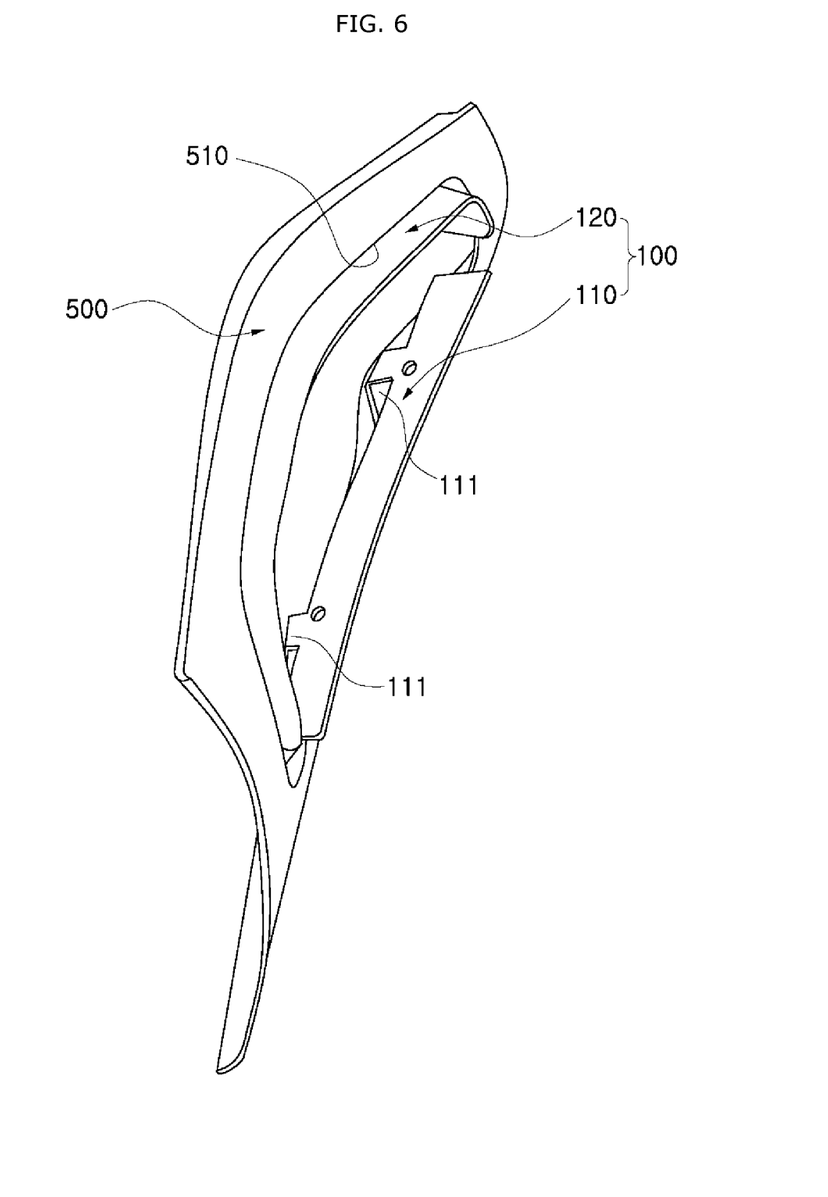
FIG. 6 is a perspective view illustrating the housing, the bracket and a decoration member of the side airbag in accordance with the disclosed embodiment.

FIG. 4 is a perspective view illustrating the housing, the cushion and the auxiliary bracket of the side airbag coupled to one another, FIG. 5 is a rear view illustrating the housing and the bracket of the side airbag, and FIG. 6 is a perspective view illustrating the housing, the bracket and a decoration member of the side airbag in accordance with the disclosed embodiment.

Figure 7:
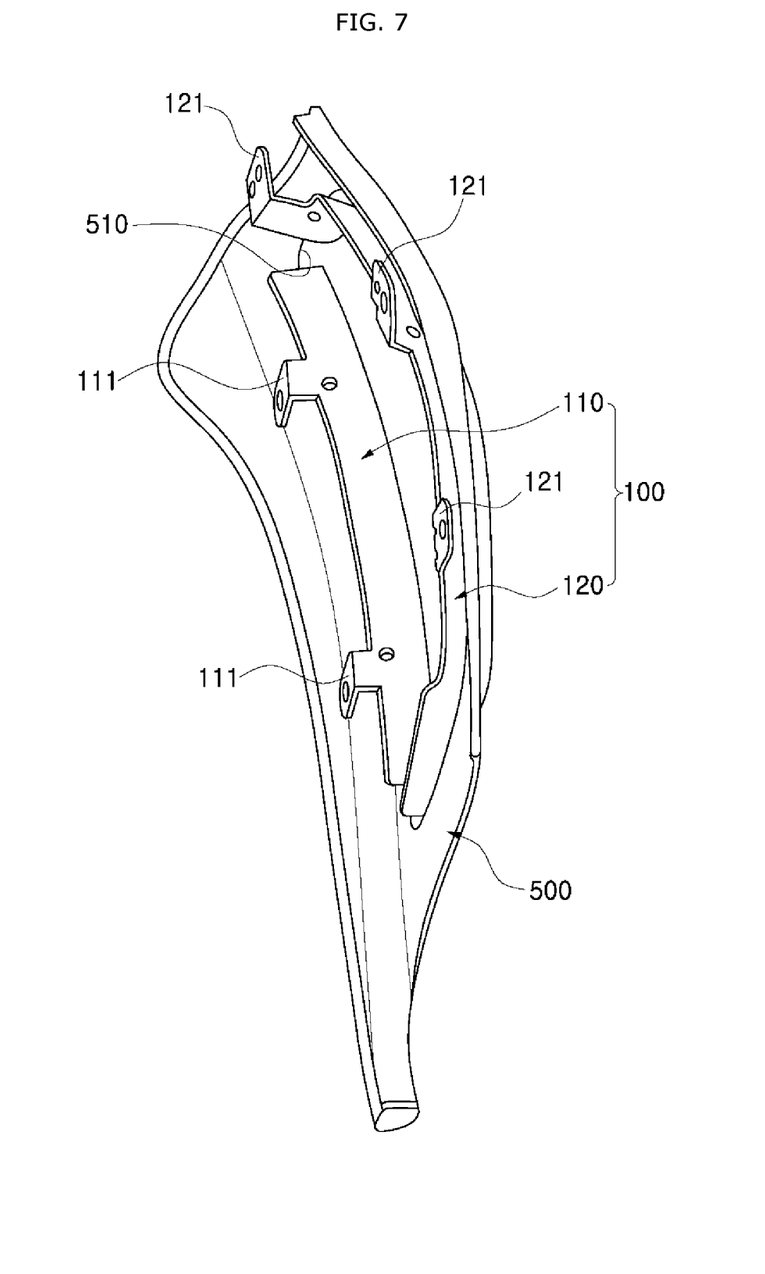
FIG. 7 is a perspective view illustrating the bracket and the decoration member of the side airbag, in accordance with the disclosed embodiment.
Figure 8:
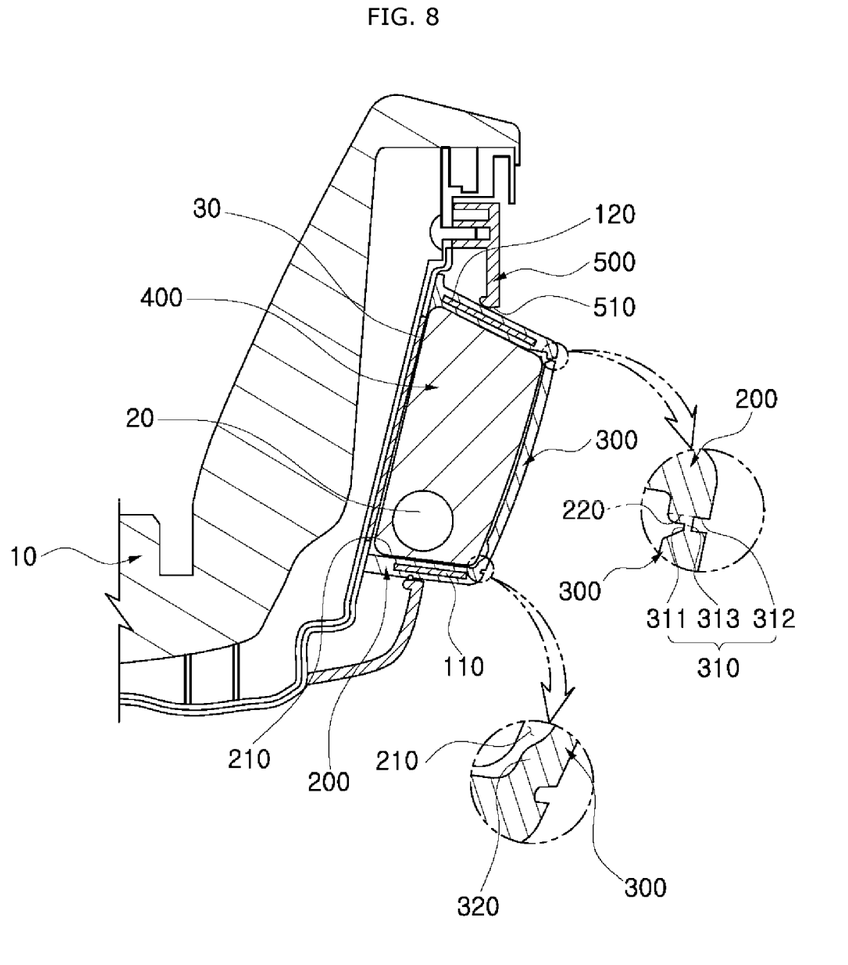
FIG. 8 is a cross-sectional view taken along line A-A, illustrating the side airbag, in accordance with the disclosed embodiment, installed in the seat.
Figure 9:
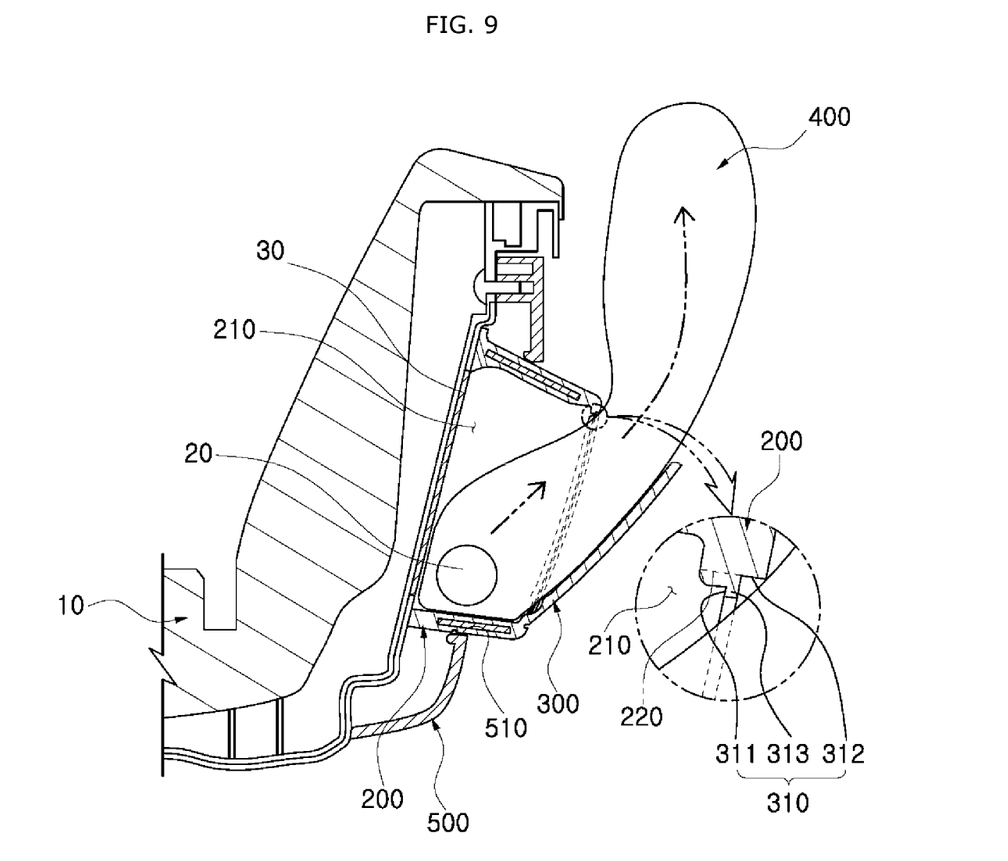
FIG. 9 is a cross-sectional view taken along line A-A, illustrating the cushion of the side airbag in accordance with the disclosed embodiment, as deployed.

FIG. 7 is a perspective view illustrating the bracket and the decoration member of the side airbag in accordance with the disclosed embodiment, FIG. 8 is a cross-sectional view taken along line A-A, illustrating the side airbag in accordance with the disclosed embodiment, installed in the seat, and FIG. 9 is a cross-sectional view taken along line A-A, illustrating the cushion of the side airbag deployed.

Referring to FIGS. 1 to 9, the side airbag, in accordance with the disclosed embodiment, includes a bracket 100, a housing 200, a cover 300 and a cushion 400.

The bracket 100 serves to couple the housing 200 to a side portion of a seat 10. The bracket 100 is inserted into the housing 200 by a well-known insert molding method.

The bracket 100 is inserted along the edge of the housing 200, and a portion of the bracket 100, protruding outwardly from the edge of the housing 200, may be coupled to the side portion of the seat by fastening members B.

More specifically, the bracket 100 may include a first frame 110 and a second frame 120. The first frame 110 may be inserted along the edge of the housing 200, which will be described below, through the insert molding method, and the second frame 120 may be inserted along the edge of the housing 200 through the same method.

The first frame 110 may be made of a metallic material or the like. The first frame 110 may be inserted into the rear side of the housing 200 through the insert molding method, and have a predetermined length to follow the edge of the housing 200.

The first frame 110 has first connectors 111 to be coupled to the side portion of the housing 200, which will be described below, and each of the first connectors 111 has a fastening hole for coupling the corresponding fastening member B.

The first frame 110 may have a bent shape corresponding to the shape of the housing 200, and the first connector 111 may protrude outwardly to the outside of the housing 200 in the widthwise direction of the first frame 110.

The second frame 120 may be made of a metallic material or the like. The second frame 120 may be inserted into the front side of the housing 200 through the insert molding method, and have a predetermined length to follow the edge of the housing 200.

The second frame 120 has second connectors 121 to be coupled to the side portion of the housing 200, which will be described below, and each of the second connectors 121 has a fastening hole for coupling the corresponding fastening member B.

The second frame 120 may have a bent shape corresponding to the shape of the housing 200, and the second connector 121 may protrude externally to the outside of the housing 200 in the widthwise direction of the second frame 120.

Since the first and second frames 110 and 120 reinforce the edge of the housing 200, the first and second frames 110 and 120 may prevent damage to the edge of the housing 200 when the cushion 400, to be described below, is deployed. Furthermore, since the first and second frames 110 and 120 are installed so as to be inserted within the thickness of the housing 200, the volume of the side airbag may be reduced.

The housing 200 is coupled to the side portion of the seat 10 by the bracket 100 formed using insert molding, and has an internal housing space 210 that communicates with the outside through an opening 220 formed on one side thereof.

The cover 300 is integrally formed with the housing 200 at one side of the housing 200, and configured to close the opening 220. The cover 300 has a tear line 310 formed along the edge of the cover 300 so as to be concave toward the side.

The tear line 310 may be formed along the edge of the housing 200 to have a relatively small thickness, and torn away when the cushion 400 is deployed. The tear line 310 may include an inner groove 311, an outer groove 312 and a connection unit 313.

As illustrated in FIG. 8, the inner groove 311 may be concavely formed on the inner surface of the cover 300, and along the edge of the cover 300.

The outer groove 312 may be concavely formed on the outer surface of the cover 300, corresponding to the inner groove 311, and successively formed along the edge of the cover 300.

The connection unit 313 is torn away by an inflation force when the cushion 400 is deployed, is formed between the outer groove 312 and the inner groove 311, and connects the edge of the cover 300 to the inner circumferential surface of the opening 220.

The cover 300 may be connected to the inner circumferential surface of the opening 220 by a hinge part 320. When the cushion 400 is deployed, the cover 300 connected to the hinge part 320 opens outwardly.

The hinge part 320 is not torn away when the cushion 400 is deployed. The cover 300 may be formed on the rear side of the housing 200 where the first frame 110 is installed, and the hinge part 320 may be oriented in a top-to-bottom direction.

At this time, the inner groove 311, the outer groove 312 and the connection unit 313 may be selectively formed in a region excluding the hinge part 320, and the hinge part 320 may be formed on the inner surface of the cover 300.

The hinge part 320 may form the rotation center of the cover 300 which is opened when the cushion 400 is deployed. As the tear line 310 is torn, the cover 300 may be rotated around the hinge part 320 and opened outwardly.

When gas is supplied from a gas supply unit 20, the cushion 400 is deployed to the side portion of the seat 10 so as to support a passenger from the side. When the cushion 400 is deployed, as illustrated in FIG. 9, the cushion 400 is deployed to the outside of the housing 200 while tearing the connection unit 313 of the tear line 310, and the cover 300 connected to the hinge part 320 opens outwardly.

The cushion 400 has one side connected to a gas discharge portion of the gas supply unit 20, and includes a filling chamber formed therein adapted to be filled with gas.

The cushion 400 may be contracted and housed in the housing space 210 of the housing 200. When the cushion 400 is deployed, the cushion 400 is deployed to the side portion of the seat 10, and supports the body (head, shoulder, chest, abdomen or the like) of the passenger seated on the seat 10 from the side.

The side airbag may further include a decoration member 500 coupled to the side portion of the seat 10, the decoration member 500 covering the edge of the housing and having a through-hole 510 through which the housing 200 extends to the side portion of the seat.

At this time, the side portion of the housing 200, where the cover 300 is positioned, protrudes through the through-hole 510 of the decoration member 500, and the decoration member 500 covers the first connector 111 of the first frame 110 and the second connector 121 of the second frame 120 at the side portion of the seat 10.

That is, since the edge of the housing 200 is covered by the decoration member 500, the first and second connectors 111 and 121 and the fastening member B, which are coupled to the side portion of the seat 10, may not be exposed to the outside of the seat 10, which makes it possible to retain a simple finish to the exterior of the seat 10.

The housing space 210 may further have an auxiliary bracket 30 coupled to a side surface of the seat 10, and the cushion 400 and the gas supply unit 20 for supplying gas to the cushion 400 may be coupled to the auxiliary bracket 30.

For example, when the cushion 400 is deployed, one side of the cushion 400 applies a force toward the cover 300 on the opposite side so as to tear the tear line 310, while being supported by the auxiliary bracket 30.

As a result, since the edge portion of the housing 200 is reinforced by the insert molding method, it is possible to prevent damage to the housing by the inflation force of the cushion 400. Since the cover 300 is integrally formed with the housing 200, the number of parts in the apparatus may be reduced, and the assembly process and structure thereof may be simplified.

Furthermore, when the cushion 400 is deployed, the cover 300 is torn away along the tear line 310 having a relatively small thickness, which makes it possible to easily deploy the cushion 400 in a predetermined direction.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A side airbag comprising:
    a cushion configured to inflate and deploy when supplied with a gas;
    a housing configured to house the cushion, the housing comprising:
        a first main side facing in a first direction toward a side portion of a seat;
        a second main side facing in a second direction opposite to the first direction;
        an internal housing space positioned between the first and second main sides, wherein the cushion is positioned at the internal housing space;
        a cover positioned at the second main side of the housing and configured to cover the internal housing space, wherein the cover is formed integrally with the housing; and
        a tear line extending along an edge of the cover; and
    a bracket configured to couple the housing to the side portion of the seat,
    wherein the cushion is configured to push the cover outwardly and deploy through the second main side when inflated, and
    wherein the cover is configured to be torn away along the tear line when pushed by the cushion.

2. The side airbag of claim 1, wherein the housing further comprises a hinge coupled between the cover and a portion of the housing adjoining the cover.

3. The side airbag of claim 1, wherein the tear line comprises a groove formed on an outer surface of the housing and extending along an edge of the cover.

4. The side airbag of claim 1, wherein the tear line comprises a groove formed on an inner surface of the housing and extending along an edge of the cover.

5. The side airbag of claim 1, wherein the tear line comprises:
    an outer groove formed on an outer surface of the housing and extending along an edge of the cover; and
    an inner groove formed on an inner surface of the housing and extending along the edge of the cover.

6. The side airbag of claim 5, further comprising a connection unit formed between the outer groove and the inner groove and connecting the edge of the cover to the inner surface of the housing.

7. The side airbag of claim 6, wherein the connection unit is configured to be torn off when the cushion is inflated and pushes the cover.

8. The side airbag of claim 1, further comprising:
an auxiliary bracket positioned at the internal housing space and connected to the side portion of the seat; and
a gas supply unit configured to supply the gas to the cushion,
wherein the cushion and the gas supply unit are connected to the auxiliary bracket.

9. The side airbag of claim 8, wherein when the cushion is deployed, the cushion applies the inflation force toward the cover while being supported by the auxiliary bracket.

10. A side airbag comprising:
a bracket coupled to a side portion of a seat;
a housing having an opening formed at one side of the housing and an internal housing space connected to the opening, wherein the bracket is connected to the housing along an edge of the housing;
a cover formed integrally with the housing at a portion of the housing covering the opening and having a tear line formed along an edge of the cover; and
a cushion housed in the internal housing space of the housing and configured to inflate and deploy outwardly through the opening of the housing when a gas is supplied to the cushion,
wherein the cover is configured to be torn away along the tear line and removed from the opening by an inflation force of the cushion when the gas is supplied to the cushion,
wherein the bracket comprises:
a first frame connected to the housing along the edge of the housing and having a first connector configured to connect the first frame to a side surface of the seat; and
a second frame connected to the housing along the edge of the housing and having a second connector configured to connect the second frame to the side surface of the seat.

11. The side airbag of claim 10, further comprising a decoration member connected to the side portion of the seat, covering the edge of the housing and having a through-hole through which the housing extends to the side portion of the seat.

12. The side airbag of claim 11, wherein the first and second connectors protrude outwardly from the edge of the housing, and the decoration member covers the first and second connectors at the side portion of the seat.

* * * * *